(12) United States Patent
Pater et al.

(10) Patent No.: US 8,137,731 B2
(45) Date of Patent: *Mar. 20, 2012

(54) PET'S CHEW

(75) Inventors: Willem Theodoor Martinus Pater, Winschoten (NL); Geraldus Gerardus Johannes Schennink, Wehl (NL); Jacob Terpstra, Assen (NL)

(73) Assignee: Paragon Pet Products Europe B.V., Veendam (NL)

( * ) Notice: Subject to any disclaimer, the term of this patent is extended or adjusted under 35 U.S.C. 154(b) by 1077 days.

This patent is subject to a terminal disclaimer.

(21) Appl. No.: 10/575,733

(22) PCT Filed: Oct. 13, 2004

(86) PCT No.: PCT/NL2004/000718
§ 371 (c)(1), (2), (4) Date: Nov. 8, 2006

(87) PCT Pub. No.: WO2005/034646
PCT Pub. Date: Apr. 21, 2005

(65) Prior Publication Data
US 2007/0212473 A1  Sep. 13, 2007

(30) Foreign Application Priority Data
Oct. 17, 2003 (EP) .................................. 03078295

(51) Int. Cl.
*A23K 1/18* (2006.01)

(52) U.S. Cl. ........ 426/635; 426/630; 426/658; 426/512; 426/661; 426/805; 426/623

(58) Field of Classification Search ................. 426/623, 426/630, 635, 518, 805, 658, 512, 661
See application file for complete search history.

(56) References Cited

U.S. PATENT DOCUMENTS

| | | | |
|---|---|---|---|
| 4,076,846 A | | 2/1978 | Nakatsuka et al. |
| 5,095,054 A | * | 3/1992 | Lay et al. .................. 524/47 |
| 5,281,432 A | * | 1/1994 | Zallie et al. ................ 426/549 |
| 5,316,578 A | * | 5/1994 | Buehler et al. ............. 106/209.1 |
| 5,320,669 A | * | 6/1994 | Lim et al. ................... 106/127.1 |
| 5,427,614 A | * | 6/1995 | Wittwer et al. ............ 106/209.1 |
| 5,428,150 A | * | 6/1995 | De Bock et al. ............ 536/102 |
| 5,459,258 A | * | 10/1995 | Merrill et al. ................ 536/123 |
| 5,523,293 A | | 6/1996 | Jane et al. |
| 5,827,565 A | | 10/1998 | Axelrod |
| 5,855,946 A | * | 1/1999 | Seib et al. .................... 426/549 |
| 6,455,083 B1 | | 9/2002 | Wang |

FOREIGN PATENT DOCUMENTS

| | | |
|---|---|---|
| WO | WO-01/45517 | 6/2001 |

OTHER PUBLICATIONS

International Search Report for PCT/NL2004/000718, mailed on May 2, 2005, 3 pages.

\* cited by examiner

*Primary Examiner* — Chhaya Sayala
(74) *Attorney, Agent, or Firm* — Morrison & Foerster LLP

(57) ABSTRACT

The invention relates to a pet's chew prepared from natural materials of renewable sources. The chew is both edible and biodegradable, and is furthermore both tough, flexible and dimensionally stable, and maintains these characteristics over a much longer time than chew known in the art.

20 Claims, No Drawings

PET'S CHEW

CROSS-REFERENCE TO RELATED APPLICATION

This application is a U.S. National Phase of PCT/NL2004/000718, filed on 13 Oct. 2004, which claims priority to European patent application EP03078295.7, filed on 17 Oct. 2003. The contents of said applications are incorporated herein in their entirety.

The invention relates to a process for producing a pet's chew and to a pet's chew obtainable by said process.

Chewable articles for pets such as dogs are well known in the art. These articles are of a flexible nature and serve as a toy for the pet as well as a means of keeping the pet's dentures in good condition. This type of article can be manufactured of different materials. Mainly, they can be divided in two classes: a non-edible variant and an edible variant.

The non-edible variant of a pet's chew can be made from synthetic plastic materials or from raw hide. They have good chewing qualities and, due to their mechanical properties, they have a fairly long lasting time. The greatest disadvantage of most of the non-edible chews is that they are hardly biodegradable, if at all.

Edible pet's chews are mostly produced from raw materials such as cereals, rice, milk and products derived therefrom such as casein, gelatin, and starches. Typically, they comprise numerous additives such as gums, meat or other products of animal origin, mineral oils or fats, vitamins, coloring agents, aromas or taste enhancers. The aim is, of course, to produce a coherent product having the desired mechanical properties to last a long time.

U.S. Pat. No. 5,827,565 discloses a dog chew based on a thermoplastic starch, PARAGON IM 1010. This thermoplastic starch comprises a fairly large amount of calcium carbonate. The dog chew has a brittle character and is therefore less suitable for dogs.

A disadvantage of most known edible chews is that their mechanical properties are not satisfactory. Due to the fact that they comprise a mixture of several ingredients, they are often brittle and often fall apart soon after a pet, such as a large dog, has set its teeth in it.

The present invention aims to provide a pet's chew prepared from natural materials of renewable sources, making the chew both edible and biodegradable. It is specifically desired that the chew has excellent mechanical properties, i.e. a good flexibility, combined with a good dimensional stability and that these properties are retained over a prolonged period of time. Thus, it is desired to achieve a product with stable dimensions and a substantially constant flexibility which means an elasticity modulus which maintains a low value over a long period of time.

It has been found that an excellent pet's chew can be produced from thermoplastic starch by incorporating relatively large amounts of plasticizer and fibers. Accordingly, the invention relates to a process for preparing a pet's chew comprising preparing a mixture of a starch derivative, a plasticizer and a fibrous material, and optionally other additives to enhance the product properties further;
converting said mixture into a thermoplastic mass; and
moulding the thermoplastic mass into the desired pet's chew,
wherein the starch derivative is a chemically modified starch.

Due to the nature of the raw material on which a pet's chew according to the invention is based, starch, it is a biodegradable, edible product to which no risks associated with for instance BSE or *Salmonella* are associated. Furthermore, the specific composition of starting materials and the method of producing the chew makes that it has excellent mechanical properties. It has been found that when, instead of a starch derivative, a native starch with amylopectin/amylose ratios between 50/50 and 85/15 is used without any other stabilizing agent, a product is obtained which is flexible just after production, but becomes stiffer and more brittle after some time, typically after about two months.

A pet's chew according to the invention is both tough and flexible, and maintains these characteristics over a much longer time than chews known in the art. It furthermore has a long lasting time. It is a product which, in its mechanical properties, closely resembles known chews based on synthetic materials, while it is nevertheless edible and biodegradable. Due to its advantageous mechanical properties, a chew according to the invention has a beneficial effect on the dentures of a pet.

As mentioned, a pet's chew according to the invention is based on starch. In principle, the starch may be of any origin. Suitable examples are potato, wheat, corn, tapioca, rice and pea starches. In accordance with the invention, the starch derivative is a chemically modified starch, preferably an oxidized starch, starch ester (e.g. acetylated starch), starch ether (e.g. hydroxyalkylated starch or carboxymethylated starch), hydrolysed or partially hydrolysed starches or crosslinked starch. Combinations and derivatives of these products may also be used.

The preparation of oxidized starches, starch esters, starch ethers, hydrolysed or partially hydrolysed starches and crosslinked starches is known per se and may be performed in any known manner. For a general description of these derivatization or modification reactions of starch reference is made to Tegge, Günther, "Stärke and Stärkederivate", Hamburg: Behr, 1984. For oxidized starch, starch esters and starch ethers the degree of substitution can be used to characterize the degree of modification. The degree of substitution (DS) used in this invention is preferably between 0.0005 and 0.5, more preferably between 0.0007 and 0.4, yet more preferably between 0.005 and 0.3. For crosslinked starches it is preferred that the starch contains one crosslink per 10 to 30,000 glucose units, more preferably per 25 to 25,000 glucose unit, even more preferably between 50 and 22,000 glucose units.

Oxidation of starch may be carried out using any known oxidizing agent, such as an alkali metal hypochlorite or hydrogen peroxide. Preferably, sodium hypochlorite is used as oxidizing agent. Alkali metal hypochlorites are relatively cheap and have a relatively large oxidizing power, thus leading to a very efficient and fast oxidizing process. The amount in which the oxidizing agent is added may vary between 0.001 and 0.4 moles of alkali metal hypochlorite per mole starch, preferably between 0.0025 and 0.15 moles of alkali metal hypochlorite per mole starch. The skilled person will be aware that the alkali metal hypochlorite should be added to the starch in a controlled manner.

Hydroxyalkylation is preferably performed using a hydroxyalkylating agent having an alkyl chain having from 1-20 carbon atoms, preferably from 1-12 carbon atoms, more preferably from 1-4 carbon atoms. Examples of suitable hydroxyalkylating agents include ethylene oxide, propylene oxide, butylene oxide, allyl glycidyl ether, propyl glycidyl ether, butyl glycidyl ether, and combinations thereof. Preferably, ethylene oxide or propylene oxide is used to hydroxyalkylate the starch.

Carboxymethylation of starch can be performed by reacting starch with monochloroacetic acid or sodium monochloroacetate in the presence of sodium hydroxide.

Acetylation of starch is in fact an esterification of the starch. Esterification of starch leads to the introduction of alkyl and/or anionic substituents on the starch. The alkyl group can, for instance, be an acetate or propionate group. Anionic substituents attached to the starch via an ester linkage may be obtained by reaction of the starch with (alkyl) succinic anhydrides or phosphate salts, for example sodium tripolyphosphate. In accordance with the invention, the starch is preferably esterified using acetic anhydride.

In a crosslinking reaction, the starch is treated with a reagent, a crosslinking agent, having two or more reactive groups. The crosslink agent is preferably attached to the starch via ester and/or ether linkages. Examples of suitable reactive groups are anhydride, halogen, halohydrin, epoxide or glycidyl groups, or combinations thereof. Epichlorohydrin, sodium trimetaphosphate, phosphorous oxychloride, phosphate salts, chloroacetic acid, adipic anhydride, dichloroacetic acid, and combinations thereof have been found to be suitable for use as crosslinking agents. Preferably, crosslinking is performed using epichlorohydrin or sodium trimetaphosphate.

Hydrolysed or partially hydrolysed starches, sometimes referred to as low-viscosity starches, are produced by controlled degradation of native starches. These starches are obtained when starch is subjected to a treatment which results in rupture of some of the glucosidic bonds in the starch molecule. The production of these starches can be carried out by heat, acids, oxidizing agents, enzymes or combinations of these agents. In case of acid hydrolysed starch the native starch is suspended in a dilute acid solution (such as hydrochloric or sulphuric acid) and maintained at a temperature from room temperature to just below the pasting temperature. The suspension is stirred until the potential viscosity of the suspended starch is reduced to the desired level. The suspension is then neutralized, washed and dried. These hydrolysed starches can be characterised by their viscosity.

In case two or more of the above described modifications of the starch are carried out, these reactions may performed simultaneously or in any subsequent order. Preferably, they are performed simultaneously.

The mixture that is to be converted into a thermoplastic starch according to the invention preferably comprises an amount of the starch derivative of from 15 to 90 wt. %, preferably from 51 to 80 wt. %, based on dry solid weight of the mixture.

In addition to the above described starch derivative, a second starch product may be used. This second starch product can be in native form, but may also be physically or chemically modified. Of course, it is also possible to use combinations of native starch and modified starch, or combinations of different modified starches, in addition to the above described starch derivative. Chemically modified starches which may be used are oxidized starches, carboxymethylated starches, hydroxyalkylated starches, acetylated starches, (partially) crosslinked starches, (partially) hydrolysed starches, and other derivatized starches. An example of a suitable physically modified starch is a starch which has been subjected to ion exchange with, for instance, sodium or potassium ions. This second starch product can be present in quantities between 0 and 99.5 wt. % of the total dry polysaccharide content.

In a preferred embodiment, the mixture may additionally also comprise a special polysaccharide. These special polysaccharides can be branched polysaccharides such as various gums (more specific xanthan gum and their derivatives), linear polysaccharides as alginates and their derivatives or malto-oligosaccharides, such as maltose. Combinations and/or derivatives of these materials can also be used. These materials may be used in addition to the starch derivative as set forth above it is preferably employed in an amount of from 1 to 30 wt. %, based on dry solid weight of the mixture. If desired, the starch derivative may be mixed with other natural and biodegradable polymers such as cellulose and derivatives thereof, proteins such as zein or wheat proteins, or other polysaccharides such as pectin or dragant. It is also possible to use a natural mixture of starch and proteins, such as flour, as a starting material. It is particularly preferred that the total amount of protein is below 20% by weight based on dry solid weight of the mixture.

In order to prepare a pet's chew of a starch material according to the invention, the mixture comprising the starch derivative is first converted into a thermoplastic mass. For that purpose, the mixture of the starch derivative with suitable additives is prepared, and then subjected to extrusion.

An important aspect of the invention is that the starch derivative is mixed with a plasticizer. Although water also has plasticizing qualities in a process of producing a pet's chew according to the invention, an additional plasticizer is required. A preferred class of plasticizers is the class of polyols. This class comprises, amongst others, glycol, diethylene glycol, alkylene glycols, polyalkylene glycol, sorbitol, glycerol, glycerol mono-esters, and the like. Other suitable classes of plasticizers include esters of citric acid, and urea.

The amount of water that is preferably present in the starting mixture, i.e. before conversion to a thermoplastic mass, to prepare a pet's chew according to the invention from is from 7 to 35 wt. %, based on total weight of the mixture. In addition to that, 5 to 35 wt. %, preferably 15 to 35 wt. %, and more preferably 18 to 35 wt. %, based on dry solid weight of the mixture, of the additional plasticizer is used. It has been found that these amounts of plasticizer lead to a very flexible product, while the dimensional stability of the final product, the pet's chew, is not endangered.

Another useful component of the pet chew material can be a regulator for the amount of starch crystallinity. For example an increase in process induced starch crystallinity results in an increase of dimensional stability substantially without affecting the flexibility of the material. Examples of crystallinity regulators are saturated and unsaturated mono-, di- or triglycerides such as glycerol monostearate and their fatty acids such as palmatic acid, stearic acid. An crystallinity regulator will be preferably be present in an amount between 0 and 8 wt. %, more preferably between 0.5 and 5 wt. %, based on dry solid weight of the mixture.

The mixture may further comprise other additives such as an emulsifier. Suitable examples of emulsifiers include lecithin and monoglycerides. An emulsifier will be preferably be present in an amount of from 0 to 5 wt. %, based on dry solid weight of the mixture.

Flow property enhancers/lubricants result in an increased processability (materials with lower viscosity) of the thermoplastic mass. Examples of flow property enhancers are animal and vegetable oils and fats, especially hydrogenated oils and fats, and fatty acids and fatty acid derivatives such as mono- and diglycerides, fatty acid amides, metal salts and sorbitanesters of these fatty acids. Also fosfatides can be used as flow property enhancer. Ricinus oil and lecithin are examples of flow property enhancers/lubricants with a particular good performance. The amount of flow property enhancer in the mixture to be converted to a thermoplastic mass can be up to 10%, more preferably between 0 and 5 wt. % based on dry solid weight.

Another important ingredient in the mixture is a fiber. Preferably, a pet food-grade fibrous material of natural origin is used. Preferred examples include cellulose, hemp, coconut, grass, flax, potato and other natural fibers. The fibers preferably have a length between 23 and 2000 µm, more preferably between 60 and 300 µm. The amount in which the fiber is preferably used is chosen in the range of from 1 to 35 wt. %, more preferably from 1 to 25 wt. %, and even more preferably 2 to 20 wt. %, based on the weight of dry solid mixture.

It is further possible to incorporate an organic or inorganic filler material, such as chalk, titanium oxide or a clay such as a montmorillonite or bentonite clay. A filler is preferably added in an amount of from 0 to 10 wt. %, based on the weight of dry solid mixture.

Other additives, such as pH regulators, health ingredients, sweeteners, coloring agents, enzymes, salts, aromas or palatability enhancers can also be incorporated at this stage. For example, as pH regulator sodium bicarbonate or a phosphate buffer can be used. As health ingredients, vitamins or conjugated linolaic acid (CLA) can be used. As aroma or palatability enhancer, chicken, beef, or vegetable (e.g. mint or vanilla) aromas are often employed. As coloring agents, red, yellow, orange (iron oxide or pepper), green (chlorophyl) or white (titanium oxide) colorants are often employed. As salts, preferably salts of monovalent anions and cations (eg. sodium chloride) are used. Typically, these additives will be added in an amount in the range of from 0 to 10 wt. %, based on dry solid weight of the mixture.

In order to prepare a thermoplastic mass of the above described mixture, it is subjected to an extrusion step. During the extrusion, the starch derivative will be gelatinised. It is preferred to use a twin-type extruder operated at a temperature of from 95 to 180° C., more preferably from 100 to 150° C. As the mixture will undergo a thorough homogenisation during extrusion, it is not of crucial importance that all ingredients of the mixture are mixed so rigorously as to obtain a homogeneous mixture prior to extrusion. During the extrusion, the starch derivative will be converted from an ordered structure into a less ordered, more or less amorphous structure, which yields a thermoplastic, well processable material. During the last phase of extrusion or during storage of the product some crystallinity might be formed.

In one embodiment, the pet's chew is moulded in an extrusion step. In principle, it is possible that this is done in the same extrusion step as described above for obtaining the thermoplastic mass. However, it is preferred that a second extrusion step is performed. In that case, the second extrusion step is preferably carried out using a single-screw type extruder. Between the first and second extrusion steps, the thermoplastic material may be pressed through a mesh having a pore size of from 1 to 5 mm and cut to obtain a granulate material. This granulate material is preferably conditioned to an appropriate moisture content for the second extrusion step. This moisture content will generally be lower than that during the first extrusion step.

It is one of the advantages of the invention that the thermoplastic material that is formed in the extruder is sufficiently plastic (at elevated temperatures) in character to be pressed through a die. The material that exits the extruder is either cut directly at the die opening to the desired size and shape, or is first cooled using forced air or nitrogen cooling and then cut to the desired size and shape. It is preferred that the material is not water cooled.

In another embodiment, the pet's chew is moulded by injection moulding. In accordance with this embodiment, it is preferred that a destructurized starch mixture is pressed through a mesh having a pore size of from 1 to 5 mm after extrusion, or preferably as a last step of the extrusion process. This will typically be done if the pet's chew is to be moulded by injection moulding. The obtained fibrous material is preferably cut to obtain a granulate material. This granulate material is preferably conditioned to a moisture content of from 5 to 20 wt. %, more preferably from 6 to 15 wt. %, even more preferably from 7 to 10 wt. %, based on the total weight of the granulate material. The moisture content can be controlled by using a vacuum zone in the extruder or by drying the granulate with hot air.

During injection moulding, it is preferred to employ a processing temperature ranging from 80 to 200° C., more preferably from 110 to 170° C. If no, or not all additives like vitamins, coloring agents, aromas or taste enhancers have been added prior to extrusion, they can also be added to the thermoplastic starch granulate directly prior to injection moulding.

The injection moulding is preferably performed using a pressure in the barrel of the apparatus of below 1500 bar. The rate of injection is preferably kept relatively low and the injection channels are preferably relatively wide in order to keep the shear, that the material is exposed to, low.

Modification of the injection moulding process may lead to an improved dimensional stability of the ultimate product. In order to achieve this, the process should be designed in such a way that the lowest amount of stresses is frozen in the matrix. This can be realised by increasing the processing temperature and high mould temperatures, in combination with a low injection speed. As a result cycle times will increase. Therefore the use of a carrousel machine may be beneficial.

The mould into which the granulate material is injection moulded, or the shape into which the material is cut after extrusion, preferably has the shape of a dog chew, such as the form of a bar, or a hollow or other natural shape, for instance mimicking the shape of a bone. Other shapes that are contemplated are of a marrow bone, pig's ear, tooth brush, or a combination of shapes such as a dog chew which is shaped like a bone on one side and like a tooth brush on the other. The final product is preferably packed in a water, moisture and air proof packaging material.

It is to be noted that it is contemplated that the above described two embodiments of extrusion and injection moulding can be combined, for instance by making use of a twin-screw extruder mounted on an injection moulding device. In accordance with such a combined embodiment, the extruded product is introduced into the injection moulding chamber without intermediate production of granulate material.

The invention will now be further elucidated by the following, non-restrictive examples.

EXAMPLE 1

Effect of Usage of Hydroxyporopylated Starch on Pet Chew Properties

X parts by weight of starch, (various types, obtained from AVEBE, Veendam, The Netherlands), 37.5 parts glycerol (type 1.26 wet, obtained from Chemproha, Enschede, The Netherlands), 3 parts by weight of lecithin (Topcitin 50 obtained from Lucas Meyer, Hamburg, Germany) and 20 parts by weight of cellulose fiber (type Arbocell BWW 40; average length of the fibre 200 µm; obtained from Rettenmaier & Söhne GmbH & Co, Rosenberg, Germany) were mixed together. In this example, the starch sources were native potato starch (X=120), native wheat starch (X=116) and a hydroxypropyl starch (DS=0.12) derivative based on potato starch (X=119).

The mixture was extruded on a Clextral BC 45 (L/D=23) extruder. The temperature profile was: 20 (feeding zone)/115/120/115/85 (die) ° C. The extrudate was granulated (pellet dimensions were about ø4 mm) and dried to a moisture content of about 10%. The granulate was injection moulded using an injection moulding apparatus Demag D60 NCIII-K, equipped with a standard PE-screw. Processing temperature was 120-130° C.; the mould temperature was 20° C. Sample bars were moulded according to DIN 23167.

The sample bars were conditioned for half a year at 20° C. and 50% relative humidity. During this period various properties were analysed. For determination of mechanical properties, a Zwick Z 010 tensile tester with strain transducers was used. Tensile properties were determined according ISO 527-2. The dimensional stability properties of the injection moulded bars were determined by comparing the length of the bars before and after conditioning.

An overview of the experiments and the results is presented in Table 1 (samples 1, 2 and 3). During a period of half a year the material based on native potato starch stiffens a lot. The material based on native wheat starch stays more flexible compared to native potato starch. The material based on hydroxypropylated potato starch is most flexible after half a year of conditioning. By using this chemically modified starch the change in flexibility is rather small compared to usage of both native starches.

EXAMPLE 2

Effect of Usage of Acid Hydrolysed Starches on Pet Chew Characteristics

X parts by weight of starch, (various types, obtained from AVEBE, Veendam, The Netherlands), Y parts glycerol (type 1.26 wet, obtained from Chemproha, Enschede, The Netherlands), 3 parts by weight of lecithin (Topcitin 50 obtained from Lucas Meyer, Hamburg, Germany) and 20 parts by weight of cellulose fiber (type Arbocell BWW 40; average length of the fibre 200 μm; obtained from Rettenmaier & Söhne GmbH & Co, Rosenberg, Germany) were mixed together. In this example, the starch sources were native potato starch (X=120; Y=37.5) and a acid hydrolysed starch derivative based on potato starch (X=121; Y=45). This derivate can be characterised by its viscosity. The viscosity of a solution of this specific starch derivate is 50 mPa*s as determined with a Brookfield LVF apparatus; spindle 1, n=30 rpm. The solution to be measured has been made by suspending 40 mg/gram dry substance in distilled water (total quantity is 260 gram). Then 180 ml of 1 M sodium hydroxide is added and the paste is stirred at 450 rpm for 3 minutes with an 8-holes blade stirrer. Hereafter the solution is conditioned at 20 ° C. for 27 minutes without stirring, after which the viscosity is measured.

The pet chew mixture was extruded on a Clextral BC 45 (L/D=23) extruder. The temperature profile was: 20 (feeding zone)/115/120/115/85 (die) ° C. The extrudate was granulated (pellet dimensions were about ø4 mm) and dried to a moisture content of about 10%. The granulate was injection moulded using an injection moulding apparatus Demag D60 NCIII-K, equipped with a standard PE-screw. Processing temperature was 120-130° C.; the mould temperature was 20° C. Sample bars were moulded according to DIN 23167.

The sample bars were conditioned for half a year at 20° C. and 50% relative humidity. During this period various properties were analysed. For determination of mechanical properties, a Zwick Z 010 tensile tester with strain transducers was used. Tensile properties were determined according ISO 527-2. The dimensional stability properties of the injection moulded bars were determined by comparing the length of the bars before and after conditioning.

An overview of the experiments and the results is presented in Table 1 (samples 1 and 4). During a period of half a year the material based on native potato starch stiffens a lot (E-modulus is related to stiffness) and shows rather high shrinkages. Due to high amounts of crystallinity this specific material based on acid hydrolysed starch has rather high stiffnesses compared to native potato starch. On the contrary this material based on partially hydrolysed starch is much more dimensionally stable than the material based on native starch.

EXAMPLE 3

Effect of Usage of Glycerol Monostearate on Pet Chew Characteristics 84.7 parts by weight of native wheat starch and 30.2 parts by weight of a hydroxypropyl starch (DS=0.12) derivative based on potato starch, (both obtained from AVEBE, Veendam, The Netherlands), 37.5 parts glycerol (type 1.26 wet, obtained from Chemproha, Enschede, The Netherlands), 3 parts by weight of lecithin (Topcitin 50 obtained from Lucas Meyer, Hamburg, Germany) and 20 parts by weight of cellulose fiber (type Arbocell BWW 40; average length of the fibre 200 μm; obtained from Rettenmaier & Söhne GmbH & Co, Rosenberg, Germany) were mixed together. In one specific experiment 1 part by weight of glycerol monostearate (Monics PR95 from Food Basics, Emmen, The Netherlands) was added to the mixture The mixture was extruded on a Clextral BC 45 (L/D=23) extruder. The temperature profile was: 20 (feeding zone)/115/120/115/85 (die) ° C. The extrudate was granulated (pellet dimensions were about ø4 mm) and dried to a moisture content of about 10%. The granulate was injection moulded using an injection moulding apparatus Demag D60 NCIII-K, equipped with a standard PE-screw. Processing temperature was 150-160° C.; the mould temperature was 20° C. Sample bars were moulded according to DIN 23167.

The sample bars were conditioned for half a year at 20° C. and 50% relative humidity. During this period various properties were analysed. For determination of mechanical properties, a Zwick Z 010 tensile tester with strain transducers was used. Tensile properties were determined according ISO 527-2. The dimensional stability properties of the injection moulded bars were determined by comparing the length of the bars before and after conditioning.

An overview of the experiments and the results is presented in Table 1 (samples 5 and 6). During a period of 26 weeks both materials stay rather flexible (the change in flexibility during this period is within the accuracy of the analysis). The big difference between both materials is their dimensional stability properties. Due to additional process induced crystallinity in the glycerol monostearate containing material, this material shows lower shrinkage percentages.

TABLE 1

| Example | Sample # | Composition[1] | | E-Modulus (Mpa) | Tensile strength (Mpa) | Strain at break (%) | Shrinkage (%) |
|---|---|---|---|---|---|---|---|
| I, II | 1 | 120PN37.5G3L20BWW40 | | | | | |
| | | | 1 week | 143 [26][2] | 5.3 [0.3] | 51.1 [2.1] | 10.0.6 |
| | | | 2 weeks | 218 [15] | 6.4 [0.3] | 45.5 [2.0] | 10.6 |
| | | | 5 weeks | 267 [21] | 7.2 [0.1] | 43.8 [1.8] | 10.6 |
| | | | 10 weeks | 267 [48] | 6.8 [0.7] | 37.3 [2.4] | 10.9 |
| | | | 26 weeks | 516 [57] | 10.7 [0.1] | 30.5. [2.0] | 11.2 |
| I | 2 | 116WN37.5G3L20BWW40 | | | | | |
| | | | 1 week | 107 [8] | 4.8 [0.2] | 50.1 [1.4] | 5.4 |
| | | | 2 weeks | 154 [21] | 5.7 [0.2] | 44.7 [2.9] | 5.4 |
| | | | 5 weeks | 149 [17] | 5.8 [0.2] | 49.8 [2.3] | 5.7 |
| | | | 10 weeks | 138 [11] | 5.4 [0.2] | 43.9 [2.5] | 5.9 |
| | | | 26 weeks | 322 [15] | 7.9 [0.3] | 32.0. [1.2] | 6.5 |
| I | 3 | 119PMHP37.5G3L20BWW4 | 0 | 150 [52] | 5.5 [0.1] | 75.4 [4.0] | 19.3 |
| | | | 1 week | | | | |
| | | | 2 weeks | 102 [18] | 5.4 [0.4] | 82.6 [9.0] | 20.2 |
| | | | 5 weeks | 65 [11] | 4.3 [0.4] | 77.7 [13.3] | 21.8 |
| | | | 10 weeks | 66 [6] | 4.3 [0.1] | 83.8 [4.0] | 22.7 |
| | | | 26 weeks | 82 [10] | 5.2 [0.2] | 75.3 [4.0] | 25.0 |
| II | 4 | 121PMAH45G3L20BWW40 | | 319 [19] | 7.1 [0.1] | 13.1 [0.3] | 0.6 |
| | | | 1 week | | | | |
| | | | 2 weeks | 328 [29] | 7.2 [0.2] | 13.0 [0.7] | 0.6 |
| | | | 5 weeks | 324 [15] | 6.9 [0.1] | 11.9 [0.5] | 0.6 |
| | | | 10 weeks | 386 [17] | 7.6 [0.2] | 11.6 [0.3] | 0.6 |
| | | | 26 weeks | 400 [25] | 8.5 [0.2] | 10.6 [0.3] | 0.8 |
| III | 5 | 84.7WN30.2PMHP37.5G3L 20BWW40 | | | | | |
| | | | 1 week | 80 [15] | 4.5 [0.1] | 69.9 [1.8] | 7.7 |
| | | | 2 weeks | 82 [10] | 4.8 [0.2] | 73.7 [2.0] | 10.3 |
| | | | 5 weeks | 72 [8] | 4.2 [0.4] | 62.0 [13.6] | 10.6 |
| | | | 10 weeks | 97 [5] | 4.5 [0.3] | 61.0 [6.5] | 11.2 |
| | | | 26 weeks | 120 [12] | 4.8 [0.5] | 55.7 [3.9] | 11.2 |
| III | 6 | 84.7WN30.2PMHP37.5G3L 1GMS20BWW40 | | | | | |
| | | | 1 week | 85 [12] | 4.5 [0.1] | 75.9 [2.0] | 5.7 |
| | | | 2 weeks | 89 [15] | 4.4 [0.3] | 74.7 [5.0] | 6.3 |
| | | | 5 weeks | 84 [7] | 4.5 [0.4] | 60.9 [10.8] | 8.2 |
| | | | 10 weeks | 90 [4] | 4.9 [0.6] | 58.5 [8.5] | 8.9 |
| | | | 26 weeks | 105 [20] | 5.0 [0.5] | 54.7 [4.5] | 9.0 |

[1]The composition can be read as follows:
starch: PN: potato starch
WN: wheat starch
PMHP: chemically modified potato starch (hydroxypropyl starch)
PMAH: chemically modified potato starch (acid hydrolysis)
plasticizer: G: glycerol
emulsifier: L: lecithin
crystallinity regulator: GMS: glycerolmonostearate
fiber: BWW40: Arbocel BWW40 200 μm fiber
[2]Standard deviation of the measurements is given in brackets

The invention claimed is:

1. A process for preparing a pet's chew from thermoplastic starch comprising
   preparing a mixture consisting of at least one starch derivative, a plasticizer, water, a fibrous material, optionally a native starch and one or more optional additives selected from the group consisting of polysaccharides, mono- or di-glycerides, lecithin, oils, fats, fatty acids or salts thereof, filler materials, vitamins, coloring agents, aromas, sweeteners and taste enhancers;
   converting said mixture into a thermoplastic starch; and
   moulding the thermoplastic starch into the desired pet's chew,
   wherein the starch derivative is a chemically modified starch, wherein said mixture comprises an amount of the starch derivative of from 15 to 90 wt. %, based on dry solid weight of the mixture, and wherein said mixture comprises an amount of the plasticizer of from 15 to 35 wt. %, based on dry solid weight of the mixture.

2. A process according to claim 1, wherein the chemically modified starch is an oxidized starch, starch ester, starch ether, hydrolysed or partially hydrolysed starch or crosslinked starch.

3. A process according to claim 1, wherein the chemically modified starch is a hydroxyalkylated, carboxymethylated, acetylated starch or acid hydrolysed starch.

4. A process according to claim 1, wherein the starch derivative is a potato, wheat, corn, tapioca, rice or pea starch derivative.

5. A process according to claim 1, wherein the mixture comprises a native starch and/or a hydrolyzed starch, and/or a chemically modified starch.

6. A process according to claim 1, wherein the plasticizer is selected from the group consisting of polyols, esters of citric acid and urea.

7. A process according to claim 6, wherein the plasticizer is glycerol.

8. A process according to claim 1, wherein the fibrous material is selected from the group consisting of cellulose, hemp, coconut, grass, flax, potato and other natural fibers.

9. A process according to claim 1, wherein the fibrous material is present in the mixture in an amount of from 1 to 35 wt. %, based on the dry solid weight of the mixture.

10. A process according to claim 1, wherein the fibrous material consists of fibers having a length between 23 and 2000 μm.

11. A process according to claim 1, wherein the mixture comprises water in an amount of from 7 to 35 wt. %, based on the total weight of the mixture.

12. A process according to claim 1, wherein the mixture comprises a branched polysaccharide, a malto-oligosaccharide, or a combination thereof.

13. A process according to claim 1, wherein the mixture is converted into a thermoplastic starch by extrusion at a temperature of from 95 to 180° C.

14. A process according to claim 13, wherein the thermoplastic starch is extruded through a mesh having a pore size of from 1 to 5 mm and cut to produce a granulate material.

15. A process according to claim 1, wherein the moisture content of the thermoplastic starch is 5 to 20 wt. %, based on the total weight of the thermoplastic starch.

16. A process according to claim 1, wherein the thermoplastic starch is moulded by injection moulding at a temperature ranging from 80 to 200° C., into a mould of suitable shape and size.

17. A pet's chew obtainable by a process according to claim 1.

18. A pet's chew according to claim 17 having the form of a dog chew, or which is a bar or is hollow or is of natural shape.

19. A process according to claim 12, wherein the branched polysaccharide is a gum.

20. A process according to claim 12, wherein the malto-oligosaccharide is maltose.

* * * * *